US010917733B2

(12) United States Patent
Huber

(10) Patent No.: US 10,917,733 B2
(45) Date of Patent: Feb. 9, 2021

(54) METHOD AND DEVICE FOR MONITORING AT LEAST ONE LOUDSPEAKER LINE

(71) Applicant: Robert Bosch GmbH, Stuttgart (DE)

(72) Inventor: Bastian Huber, Straubing (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/469,711

(22) PCT Filed: Oct. 17, 2017

(86) PCT No.: PCT/EP2017/076399
§ 371 (c)(1),
(2) Date: Jun. 14, 2019

(87) PCT Pub. No.: WO2018/114079
PCT Pub. Date: Jun. 28, 2018

(65) Prior Publication Data

US 2020/0084559 A1 Mar. 12, 2020

(30) Foreign Application Priority Data

Dec. 19, 2016 (DE) ........................ 10 2016 225 365

(51) Int. Cl.
*H04Q 1/30* (2006.01)
*H04R 29/00* (2006.01)
*G08B 29/04* (2006.01)

(52) U.S. Cl.
CPC ......... *H04R 29/007* (2013.01); *G08B 29/043* (2013.01); *H04R 29/001* (2013.01)

(58) Field of Classification Search
CPC ... H04R 29/007; H04R 29/001; G08B 29/043
(Continued)

(56) References Cited

U.S. PATENT DOCUMENTS 6,091,826 A * 7/2000 Laitinen ................. H04R 27/00
381/56
8,605,921 B2 * 12/2013 Hesdahl .................. H04S 5/005
381/304

(Continued)

FOREIGN PATENT DOCUMENTS

CH 696048 A5 11/2006
CN 102611962 A 7/2012

(Continued)

OTHER PUBLICATIONS

International Search Report for Application No. PCT/EP2017/076399 dated Dec. 13, 2017 (English Translation, 3 pages).

*Primary Examiner* — Zhen Y Wu
(74) *Attorney, Agent, or Firm* — Michael Best & Friedrich LLP

(57) ABSTRACT

The invention relates to a method for monitoring at least one loudspeaker line (120), wherein a main module (210) arranged at a first point in the at least one loudspeaker line (120) and at least one monitoring module (220) arranged at a second, remote point in each of the at least one loudspeaker lines (120) communicate, wherein a message is transmitted from the main module (210) to the at least one monitoring module (220), and/or the at least one monitoring module (220) is supplied with power, by using the loudspeaker line (120), wherein a message is transmitted from the at least one monitoring module (220) to the main module (210) by using a wireless communication connection, and a device for monitoring at least one loudspeaker line (120).

12 Claims, 2 Drawing Sheets

(58) Field of Classification Search
USPC ..................................................... 340/538.12
See application file for complete search history.

(56) References Cited

U.S. PATENT DOCUMENTS

| | | | | |
|---|---|---|---|---|
| 9,924,291 | B2 * | 3/2018 | Milne | H04S 5/00 |
| 2004/0165732 | A1 | 8/2004 | Arcaria et al. | |
| 2008/0317252 | A1 * | 12/2008 | Tjalsma | H04R 29/007 381/59 |
| 2012/0201326 | A1 * | 8/2012 | Burns | H04B 3/548 375/295 |
| 2015/0077248 | A1 * | 3/2015 | Eck | G08B 25/10 340/539.26 |
| 2016/0195864 | A1 * | 7/2016 | Kim | H04L 12/2816 709/221 |
| 2017/0164126 | A1 * | 6/2017 | Calmel | H04R 29/001 |

FOREIGN PATENT DOCUMENTS

| | | | |
|---|---|---|---|
| CN | 103140774 | A | 6/2013 |
| CN | 103442323 | A | 12/2013 |
| CN | 105678941 | A | 6/2016 |
| DE | 102010028022 | A1 | 10/2011 |
| EP | 0879502 | | 11/1998 |
| WO | 2006050754 | | 5/2006 |

* cited by examiner

METHOD AND DEVICE FOR MONITORING AT LEAST ONE LOUDSPEAKER LINE

BACKGROUND OF THE INVENTION

The present invention relates to a method and a device for monitoring at least one loudspeaker line.

The present invention relates to the field of public address systems (also known as electroacoustic or electrical loudspeaker systems). Such systems are usually permanently installed systems for public address in indoor and/or outdoor areas. Depending on the scale, within the system there may be a multiplicity of loudspeakers connected to one or more audio amplifiers by way of corresponding leads. In the case of systems with leads of great lengths, the so-called 100 V technique is usually used for transmission. With this type of transmission, the loudspeaker lead is usually galvanically isolated from the amplifiers and loudspeakers by way of transformers, the output signal being stepped up to 100 V in order to be able to transmit over great distances without any loss.

Depending on the intended use and place of use, different monitoring and security levels are appropriate, or even prescribed, for the operation of the public address system. For evacuation systems, continuous monitoring of the loudspeaker lead for any short circuit, ground fault or interruption is required.

WO 2006/050754 A2 describes for example a public address system comprising a monitoring system in which a monitoring module is supplied with power by means of a high-frequency pilot tone and the communication between the main module and the monitoring module takes place over the loudspeaker lead by way of a likewise high-frequency signal. In order to avoid any disturbance of the audio signal by the communication signal, however, complex, and consequently expensive, technology is necessary. Furthermore, the high-frequency communication signal can easily be affected by crosstalk.

DE 10 2010 028 022 A1 discloses a method for monitoring a loudspeaker line in which an impedance is changed for communication between a main module and a monitoring module over the loudspeaker line.

SUMMARY OF THE INVENTION

According to the invention, a method and a device for monitoring at least one loudspeaker line are proposed. Advantageous refinements are the subject of the subclaims and of the following description.

The invention is based on a method and a device for monitoring a loudspeaker line in the case of which a main module arranged at a first point in the loudspeaker line and at least one monitoring module arranged at a second, remote point in the loudspeaker line communicate. Such a loudspeaker line usually comprises one or more loudspeaker leads and a certain number of loudspeakers. Monitoring modules may be arranged in particular at the end of a loudspeaker line and in this context are also referred to as an "EOL module" or "end-of-line module". The loudspeaker line is in this case used for transmitting a message from the main module to the at least one monitoring module and/or for supplying power to the at least one monitoring module. For this purpose, as mentioned in DE 10 2010 028 022 A1, a preferably digital signal may be emitted by the main module over the loudspeaker line to the at least one monitoring module (forward channel). For supplying power, a (high-frequency) pilot tone may be used.

According to the invention, a wireless communication link is therefore used for transmitting a message from the at least one monitoring module to the main module (return channel). Bluetooth or WLAN come into consideration here in particular as a wireless communication link. In the case of Bluetooth, in turn, preferably the Bluetooth Low-Energy standard comes into consideration. Use of the wireless communication link as a return channel has the effect that the monitoring imposes lower demands on the loudspeaker line. Moreover, a number of monitoring units can respond within a shorter time, since no specific timeframe has to be maintained on the loudspeaker line in order to be able to respond within a predetermined time period. Apart from this, the message sent by the monitoring module, which may in particular comprise a synchronization pattern, with which for example a time sequence for the return response of the monitoring modules is fixed, can be longer than before.

In the case of public address systems such as those described in more detail at the beginning, often very many loudspeaker lines are necessary, in order for example to fit out a large building correspondingly. Therefore, a message can be sent by way of a main module to monitoring modules on various loudspeaker lines over the respective loudspeaker lines. Since the return response of all the monitoring modules is now no longer limited however by a timeframe for the communication on the loudspeaker lines, far more monitoring modules and/or loudspeaker lines can be monitored by way of one main module.

Preferably, the wireless communication link is formed by one or more communication units ("repeaters") lying between the at least one monitoring module and the main module. In the case of public address systems, often very long leads are necessary, in order for example to fit out a large building correspondingly. However, long leads may cause signals transmitted over them to become distorted on account of the capacity of the line. Transmission of signals or messages from a monitoring unit to the main module over the lead therefore becomes difficult, since the monitoring unit generally only has low energy for transmitting messages. Using the wireless communication link by way of one or more communication modules that are provided between the monitoring module and the main module, also referred to as a so-called meshed network, means that then a low transmitting power of the monitoring module is sufficient to transmit a return response to the main module.

To this extent, it is also preferred that the at least one monitoring module is supplied with power over the loudspeaker line by means of a high-frequency pilot tone, since the power thereby provided is sufficient to transmit a message initially to a nearby communication module, by way of which the message is then transmitted further. Supplying power in such a way, for example with a 20 kHz pilot tone, is known per se. However, in the case of this advantageous refinement, an interruption of the lead, for example just one conductor of the loudspeaker lead, can be detected particularly easily, since in this case the supply of power to the monitoring module fails, and consequently no return response from the monitoring module to the main module is received any longer.

It is particularly preferred if the one or more communication units is/are additionally used for a system different from the loudspeaker line. In other words, a system that has many communication units which can communicate with one another by way of a wireless communication link can therefore be additionally used for the monitoring of one or more, in particular very long, loudspeaker line(s). It goes without saying that the main module and the at least one monitoring module must then be correspondingly designed in order to set up the wireless communication link with the units mentioned. A system in which for example such communication units are used is a smoke alarm system, in which a smoke detector is respectively installed in many rooms of a building, these individual smoke detectors then being interconnected in order for example to be able to transmit to a central location a smoke alarm signal, which can then serve as an indicator for an alarm. Since such a smoke alarm system and such a public address system, in particular in the sense of an evacuation system, are usually used together in any case, with the proposed method and the proposed device a building can be fitted out with both systems inexpensively and efficiently.

Preferably, during the monitoring, at least one item of status information about the at least one monitoring module is transmitted in the message transmitted by the at least one monitoring module to the main module. While in the case of the transmission of a message over the loudspeaker line the message is generally restricted to the content “okay”, with the proposed method and the proposed device far more information about the status of the monitoring module can be transmitted, since the wireless communication link acting as a return channel means that there is no time restriction on the length of the message.

The invention is schematically represented in the drawing on the basis of an exemplary embodiment and is described below with reference to the drawing.

DETAILED DESCRIPTION

Figure 1:
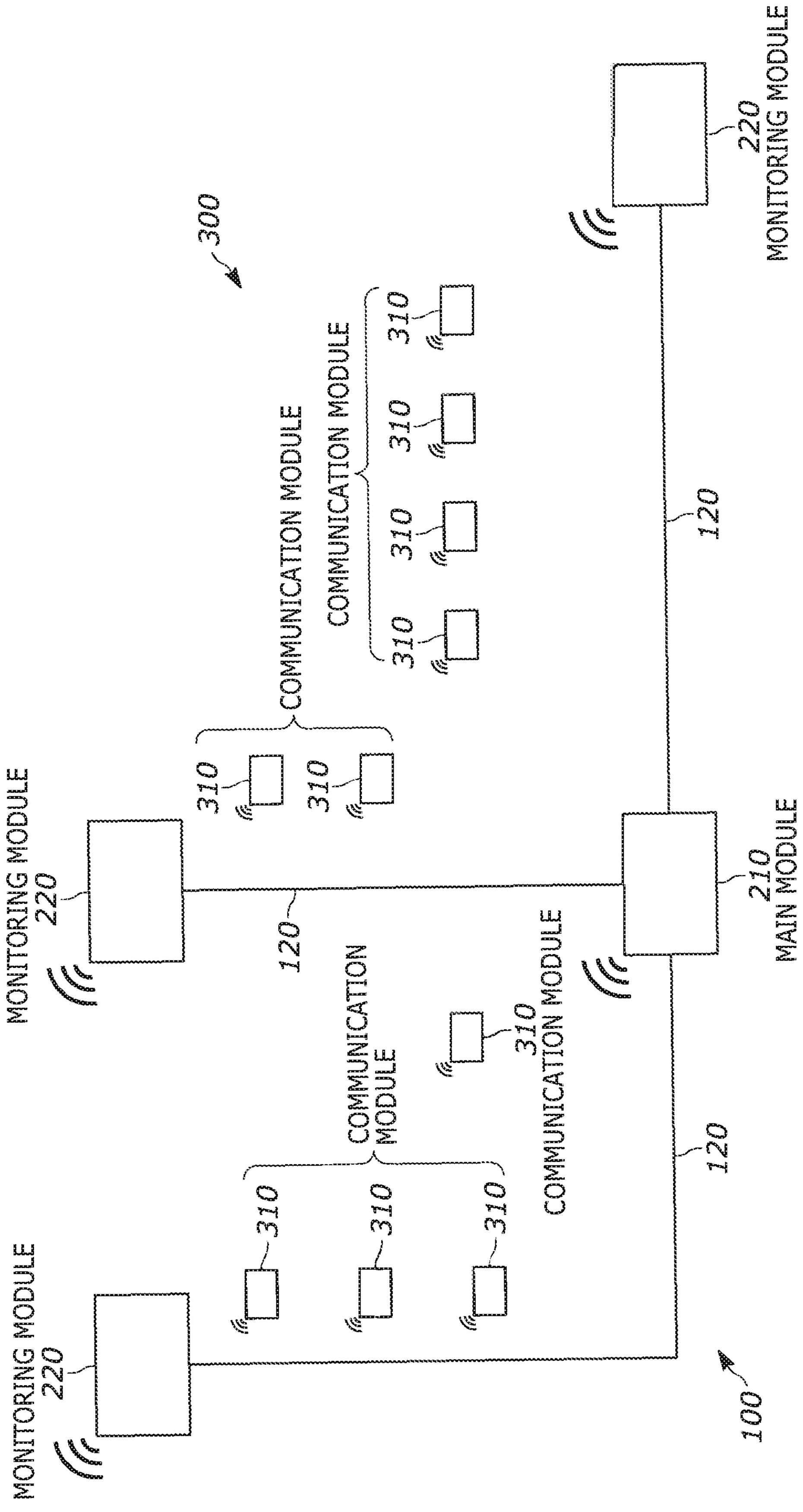
FIG. 1 schematically shows a number of loudspeaker lines with a monitoring device according to the invention in a preferred embodiment, FIG. 2 schematically shows a loudspeaker line from FIG. 1 in more detail.
Figure 2:
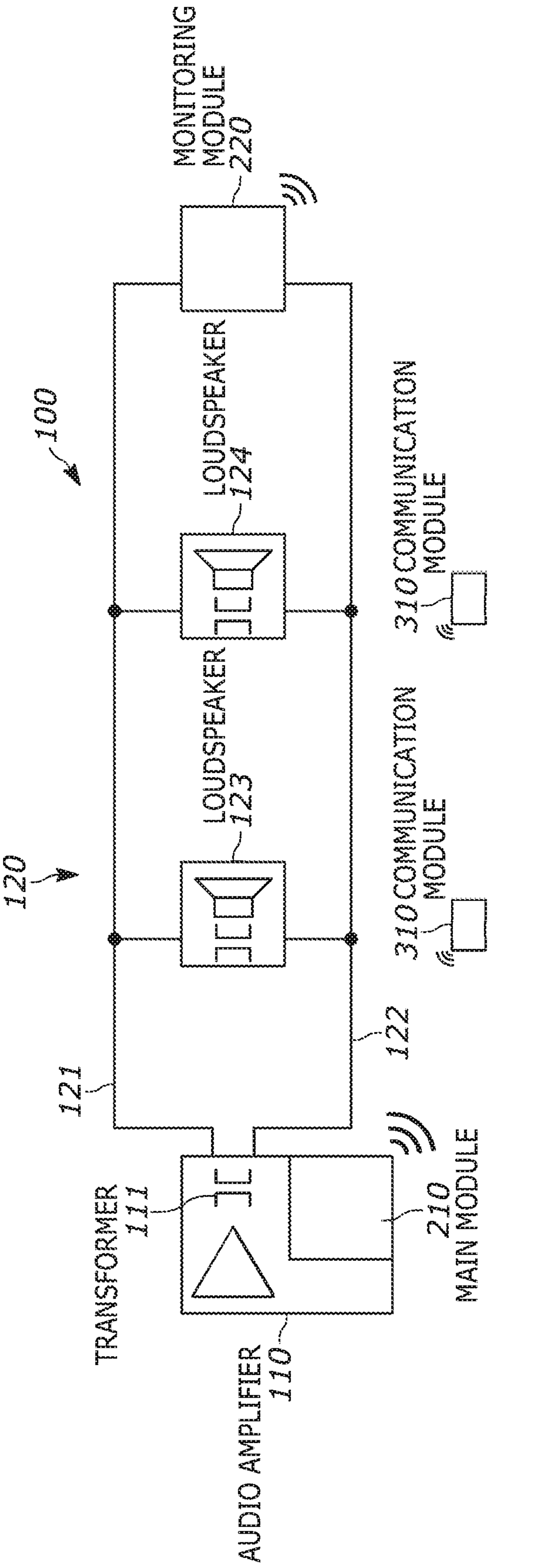

FIGS. 1 and 2 are described below in a coherent and comprehensive manner, the same elements being provided with the same reference symbols. In this case, FIG. 2 shows a more detailed representation of one of a number of loudspeaker lines that are schematically represented in FIG. 1 of a public address system 100, which has a preferred embodiment of a monitoring device according to the invention. For purposes of illustration, the public address system is only represented very schematically, with a very small number of elements, such as for example amplifiers, loudspeakers and monitoring modules. It goes without saying, however, that in practice corresponding public address systems have far more elements.

The public address system 100 has (in FIG. 2 only shown for one loudspeaker line) an audio amplifier 110, connected to the output of which, which is galvanically isolated by way of a transformer 111, is a loudspeaker line 120. The loudspeaker line 120 has two loudspeaker leads 121 and 122, connected in parallel to which are a number of loudspeakers 123, 124—likewise galvanically isolated by way of transformers. In the illustration represented, the public address system 100 is configured for the 100 V technique, so that a length of the loudspeaker line 120 may be for example in excess of 1 or 2 km. It goes without saying that the other loudspeaker lines can be set up in the same way.

For monitoring the loudspeaker lines 120, a monitoring device according to the invention is provided, comprising a main module 210 and also monitoring modules 220. For monitoring the loudspeaker lines 120, a message is respectively sent from the main module 210 over the loudspeaker lines 120 to the monitoring modules 220, preferably as a digital signal. The sending of a message may in this case take place in the way described for example in DE 10 2010 028 022 A1.

For providing the monitoring functionality, communication modules 310 are therefore used, in order to set up a wireless communication link between the monitoring modules 220 and the main module 210.

The communication modules 310 may be for example smoke detectors of a smoke alarm system 300, which are in any case connected to one another by way of a wireless communication link. Particularly preferably, these may be meshed communication units with the Bluetooth Low-Energy standard.

The main module 210 and the monitoring modules therefore themselves have in each case suitable communication means in order to set up the wireless communication link by way of the communication unit 310.

The monitoring modules 220 also additionally have a power supply, which is fed over the loudspeaker lines 120 preferably by means of a high-frequency pilot tone of for example 20 kHz.

For monitoring the loudspeaker lines 120, it is often appropriate for the main module 210 to send a message, in particular a digital (and preferably addressed) signal, which is received and processed by the connected monitoring modules. The digital signal may in particular contain an address in order to be directed specifically to certain monitoring modules.

If a receiving monitoring module detects that it is being addressed, it responds to the inquiry by sending a message, in particular likewise a digital signal, over the wireless communication link. In principle, all methods of communication that use a signal, in particular a digital signal, over a wireless communication link are suitable for the communication. The communication allows the loudspeaker lines to be monitored, because in particular, if there is a fault on a loudspeaker line, the monitoring module concerned does not send a message.

Alternatively, it may also be provided that the monitoring modules 220 report to the main module 210 at intervals of time, for example regular intervals of time, without first having to receive a message. For this, the monitoring modules may transmit corresponding messages. If the loudspeaker line then fails, the monitoring modules 220 are no longer supplied with power, and consequently can no longer transmit messages.

The invention claimed is:

1. A method for monitoring at least one loudspeaker line, wherein a main module, arranged at a first point in the loudspeaker line, and at least one monitoring module, arranged at a second point in the loudspeaker line, communicate, wherein the main module transmits a first message over the loudspeaker line to the at least one monitoring module and/or for supplying power to the at least one monitoring module, wherein the at least one monitoring module transmits a second message over a wireless communication link to the main module through a smoke detector, and wherein the smoke detector is part of a fire and/or smoke alarm system different from the at least one monitoring module arranged at the at least one loudspeaker line.

2. The method as claimed in claim 1, wherein at least one item of status information about the at least one monitoring module is transmitted in the message transmitted by the at least one monitoring module to the main module.

3. The method as claimed in claim 1, wherein Bluetooth or wireless local area network (WLAN) is used as the wireless communication link.

4. The method as claimed in claim 1, wherein the at least one monitoring module is supplied with power over the at least one loudspeaker line by a high-frequency pilot tone.

5. The method as claimed in claim 1, wherein at least two loudspeaker lines are monitored.

6. A device for monitoring at least one loudspeaker line comprising a main module, arranged at a first point in the at least one loudspeaker line, and at least one monitoring module, arranged at a second point in each of the at least one loudspeaker line, wherein the main module and the at least one monitoring module are configured to transmit a first message from the main module to the at least one monitoring module and/or for supplying power to the at least one monitoring module over the at least one loudspeaker line, wherein the at least one monitoring module is configured to transmit a second message to the main module over a wireless communication link through a smoke detector, and wherein the smoke detector is part of a fire and/or smoke alarm system different from the at least one monitoring module arranged at the at least one loudspeaker line.

7. The device as claimed in claim 6, wherein the wireless communication link is a Bluetooth or wireless local area network (WLAN) link.

8. The device as claimed in claim 6, wherein the at least one monitoring module is supplied with power over the at least one loudspeaker line by a high-frequency pilot tone.

9. A monitoring module for monitoring at least one loudspeaker line, wherein the monitoring module is configured to receive a first message and/or power from a main module over at least one loudspeaker line, wherein the monitoring module is configured to transmit a second message from the monitoring module to the main module over a wireless communication link through a smoke detector, and wherein the smoke detector is part of a fire and/or smoke alarm system different from the monitoring module for monitoring the at least one loudspeaker line.

10. The monitoring module for monitoring at least one loudspeaker line (120) as claimed in claim 9, wherein at least one item of status information about the at least one monitoring module is transmitted in the message transmitted by the at least one monitoring module to the main module.

11. The monitoring module for monitoring at least one loudspeaker line as claimed in claim 9, wherein the at least one monitoring module is supplied with power over the at least one loudspeaker line by a high-frequency pilot tone.

12. The monitoring module for monitoring at least one loudspeaker line as claimed in claim 9, wherein at least two loudspeaker lines are monitored.

* * * * *